(12) United States Patent
Chen et al.

(10) Patent No.: US 10,937,463 B1
(45) Date of Patent: Mar. 2, 2021

(54) PACKAGING TRAY FOR HARD DISK DRIVE

(71) Applicant: CompTake Technology Inc., New Taipei (TW)

(72) Inventors: Hsin-An Chen, New Taipei (TW); Chi-Lun Tai, New Taipei (TW); Wei-Hau Chen, New Taipei (TW)

(73) Assignee: COMPTAKE TECHNOLOGY INC., New Taipei (TW)

( * ) Notice: Subject to any disclaimer, the term of this patent is extended or adjusted under 35 U.S.C. 154(b) by 0 days.

(21) Appl. No.: 16/729,538

(22) Filed: Dec. 30, 2019

(51) Int. Cl.
| | |
|---|---|
| *G06F 1/16* | (2006.01) |
| *G11B 33/02* | (2006.01) |
| *G06F 1/18* | (2006.01) |
| *G11B 33/12* | (2006.01) |

(52) U.S. Cl.
CPC .......... *G11B 33/022* (2013.01); *G06F 1/181* (2013.01); *G11B 33/128* (2013.01)

(58) Field of Classification Search
CPC ....... G06F 1/181; G06F 1/187; G11B 33/022; G11B 33/0405; G11B 33/0461; G11B 33/124; G11B 33/125
USPC ............ 361/679.33, 679.34; 206/307, 307.1, 206/308.3, 722
See application file for complete search history.

(56) References Cited

U.S. PATENT DOCUMENTS

| | | | | |
|---|---|---|---|---|
| 5,553,444 A * | 9/1996 | Lovecky | ................ | B65D 81/07 206/561 |
| 6,056,124 A * | 5/2000 | Kaneko | ................. | B65D 73/02 206/561 |
| 9,850,055 B2 * | 12/2017 | Nagashima | .......... | B65D 81/051 |
| 10,665,269 B1 * | 5/2020 | Shen | .................... | G11B 33/022 |
| 2001/0020595 A1 * | 9/2001 | Koike | .................. | B64D 81/025 206/521 |
| 2004/0000504 A1 * | 1/2004 | Wang | ....................... | H05K 7/10 206/725 |
| 2006/0060496 A1 * | 3/2006 | Adams | ................. | G11B 25/043 206/725 |
| 2007/0256958 A1 * | 11/2007 | Zhang | .................... | A61B 50/33 206/725 |
| 2008/0024972 A1 * | 1/2008 | Yamaguchi | ............ | G11B 33/08 361/679.39 |
| 2008/0101008 A1 * | 5/2008 | Ulrich | .................. | G11B 33/124 361/679.37 |
| 2013/0091807 A1 * | 4/2013 | McDonald | ................ | B65B 5/04 53/473 |
| 2013/0299369 A1 * | 11/2013 | Komatani | ............ | G11B 33/025 206/307 |
| 2014/0224682 A1 * | 8/2014 | Tsai | ...................... | G11B 33/022 206/307 |
| 2016/0114955 A1 * | 4/2016 | Zhao | ................. | H01L 21/67363 206/722 |

(Continued)

*Primary Examiner* — Anthony Q Edwards
(74) *Attorney, Agent, or Firm* — Bacon & Thomas, PLLC

(57) ABSTRACT

A packaging tray for a hard disk drive has a plurality of positioning holes. The packaging tray includes a box body, and the box body has a plurality of frame walls and an accommodating space surrounded by the frame walls. The box body has formed a plurality of positioning posts at a bottom of the accommodating space, and the positioning posts are disposed corresponding to the positioning holes of the hard disk drive. Therefore, the hard disk drive placed in the accommodating space will not contact dust in the box body, and the hard disk drive in the box body can avoid scratching.

17 Claims, 5 Drawing Sheets

(56) References Cited

U.S. PATENT DOCUMENTS

2018/0197579 A1* 7/2018 Chen ..................... H05K 7/14

* cited by examiner

PACKAGING TRAY FOR HARD DISK DRIVE

BACKGROUND OF THE INVENTION

Field of the Invention

The present invention generally relates to a tray and, in particular to a packaging tray for hard disk drives.

Description of Prior Art

Electronics factories often use trays in workflow processes to provide carrying, transporting or storing functions etc. For example, in the manufacturing process of hard disk drive shells, most parts are placed in plastic trays for transportation to facilitate assembly and packaging of products in assembly plants.

However, since manufacturing of hard disk drive shells are not performed in a clean room. Therefore, dust might be easily accumulated in plastic trays when carrying or storing parts. Furthermore, existing hard disk drive shells are often anodized or painted, and when these parts are placed in plastic trays, the surfaces of the parts are easily to be scratched because they are exposed to dust in the plastic trays, and defective parts will be increased.

In view of the above drawbacks, the Inventor proposes the present invention based on his expert knowledge and elaborate researches in order to solve the problems of prior art.

SUMMARY OF THE INVENTION

Accordingly, an object of the present invention is to provide a packaging tray for placing a hard disk drive in the accommodation space without contacting dust so that the hard disk drive in the box body can avoid scratching.

In order to achieve the object mentioned above, the present invention provides a packaging tray for storing and locating a hard disk drive having a plurality of positioning holes. The packaging tray includes a box body, and the box body has a plurality of frame walls and an accommodating space surrounded by the frame walls. The box body has formed a plurality of positioning posts at a bottom of the accommodating space, and the positioning posts are disposed corresponding to the positioning holes of the hard disk drive.

Comparing to the prior art, the packaging tray of the present invention has formed positioning posts in the accommodating space of the box body. The positioning post is inserted in the positioning holes of the hard disk drive, so that the hard disk drive in the accommodating space is kept at a distance from the bottom of the accommodating space without contacting the box body; thus the hard disk drive can be prevented from scratching due to the dust in the box body. In addition, a front stage and a rear stage are formed on the inner side of the box body for placing and positioning the front and rear sides of the hard disk drive. Besides, a plurality of bumps is formed on the left and right sides of the box body to abut against and position the left and right sides of the hard disk drive. Therefore, the hard disk drive can be positioned in the accommodating space without being scratched, and the practicality of the prevention will be enhanced.

BRIEF DESCRIPTION OF DRAWINGS

The features of the invention believed to be novel are set forth with particularity in the appended claims. The invention itself, however, may be best understood by reference to the following detailed description of the invention, which describes a number of exemplary embodiments of the invention, taken in conjunction with the accompanying drawings, in which:

DETAILED DESCRIPTION OF THE PREFERRED EMBODIMENTS

In cooperation with attached drawings, the technical contents and detailed description of the invention are described thereinafter according to a number of preferable embodiments, being not used to limit its executing scope. Any equivalent variation and modification made according to appended claims is all covered by the claims claimed by the present invention.

Figure 1:
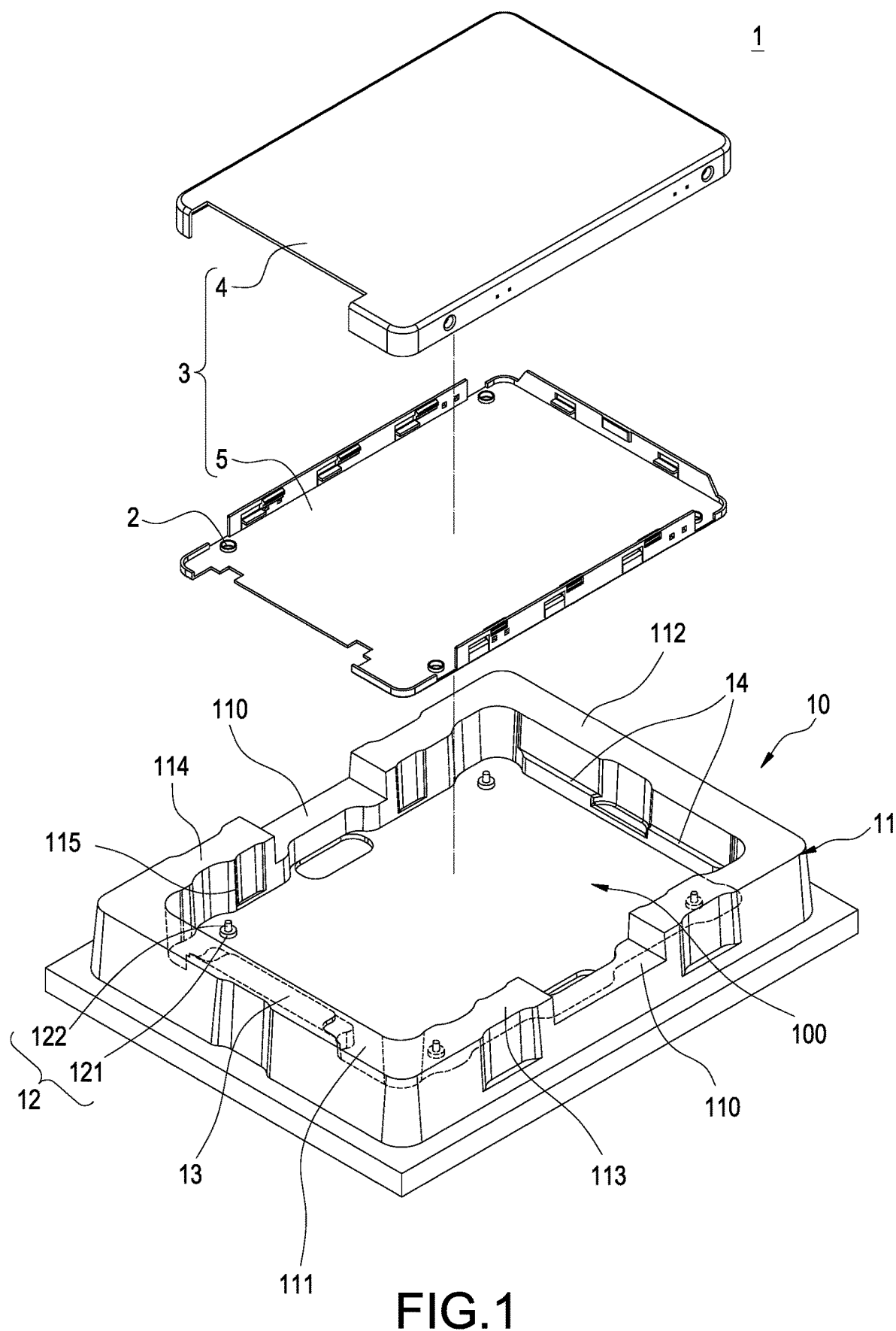
FIG. 1 is a combination schematic view of packaging tray and hard disk drive of the present invention.
Figure 2:
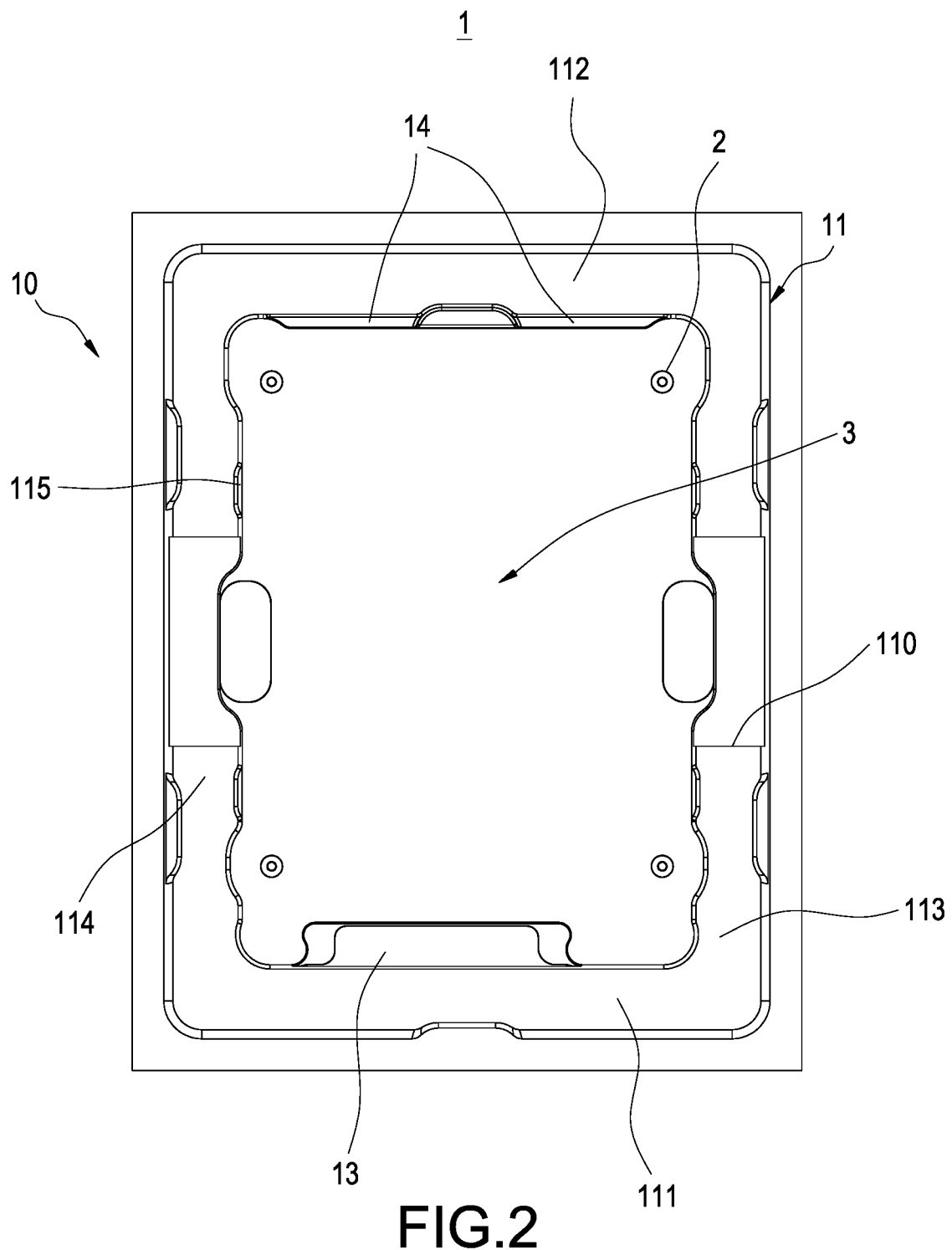
FIG. 2 is a top view of packaging tray combined with hard disk drive of the present invention.
Figure 3:
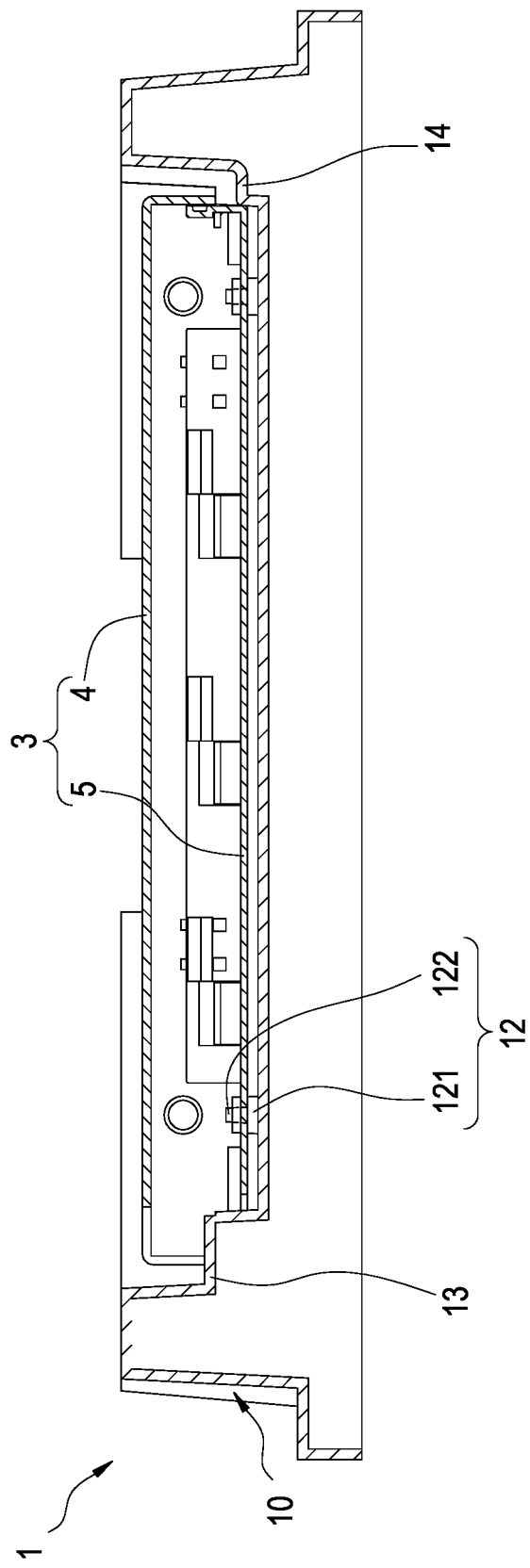
FIG. 3 is a cross sectional view of the packaging tray combined with the hard disk drive.

Please refer to FIG. 1 to FIG. 3, which depict a combination schematic view of packaging tray and hard disk drive of the present invention, a top view of packaging tray combined with the hard disk drive of the present invention and a cross sectional view of the packaging tray combined with the hard disk drive. The packaging tray 1 of the present invention is provided for storing and locating a hard disk drive 3 having a plurality of positioning holes 2. The packaging tray 1 includes a box body 10. The box body 10 has a plurality of frame walls 11 and an accommodating space 100 surrounded by the frame walls 11. The box body 10 has formed a plurality of positioning posts 12 at a bottom of the accommodating space 100, and the positioning posts 12 are disposed corresponding to the positioning holes 2 of the hard disk drive 3. More detailed descriptions of the packaging tray 1 are as follows.

In one embodiment of the present invention, the box body 10 has a rectangular configuration, and each of the positioning posts 12 is disposed at a corner of the accommodating space 100. Preferably, each of the positioning posts 12 includes a base 121 and a protrusion column 122 disposed on the base 121, and the positioning posts 12 are inserted in the positioning holes 2 of the hard disk drive 3. Thereby, the hard disk drive 3 is placed in the accommodating space 100 and a distance will be kept from the bottom of the accommodating space 100; therefore, the hard disk drive 3 will not contact dust in the box body 10 so that the hard disk drive 3 can avoid scratching.

Specifically, the frame walls 11 include a front frame wall 111, a rear frame wall 112, a left frame wall 113 and a right frame wall 114. Besides, the front frame wall 111 and the rear frame wall 112 are disposed correspondingly, so are the left frame wall 113 and the right frame wall 114.

Moreover, in the present embodiment, the hard disk drive 3 includes an upper cover 4 and a bottom cover 5, and the bottom cover 5 is provided with the positioning holes 2. On the other hand, the box body 10 has formed a front stage 13 on an inner side of the front frame wall 111 in the accommodating space 100, and the front stage 13 is disposed for positioning a front end of the upper cover 4.

It is worth noting that the hard disk drive 3 of the present invention is combined in a screwless manner. Therefore, the positioning holes 2 of the bottom cover 5 are provided only for positioning and not for combination.

In the present embodiment, the box body 10 has formed at least one rear stage 14 on an inner side of the rear frame wall 112 in the accommodating space 100. The front stage 13 and the rear stage 14 are disposed for positioning a front side and a rear side of the upper cover 4 respectively to avoid displacement of the upper cover 4. In addition, the left frame wall 113 and the right frame wall 114 are formed a plurality of bumps 115 on a side facing the accommodating space 100 separately. The bumps 115 abut against the left and right sides of the hard disk drive 3 and restrict its movement.

Preferably, the left frame wall 113 and the right frame wall 114 have a notch 110 separately, and the notch 110 is located in a middle of a side of the hard disk drive 3. It should be noted that, the deposition of the notch 110 can facilitate a user to take out the hard disk drive 3 from the accommodation space 100.

One thing to note is that, the upper cover 4 and the bottom cover 5 are combined in a screwless manner, such as combined in a snap-fit manner. Therefore, when the upper cover 4 and the bottom cover 5 are placed in the packaging tray 1, since the bottom cover 5 is positioned on the positioning posts 12 at the bottom of the accommodating space 100, and the front and rear sides of the upper cover 4 are respectively disposed on the front stage 13 and the rear stage 14 and to space apart from the bottom cover 5 without contacting, so that it can avoid unnecessary coupling during the transportation.

Figure 4:
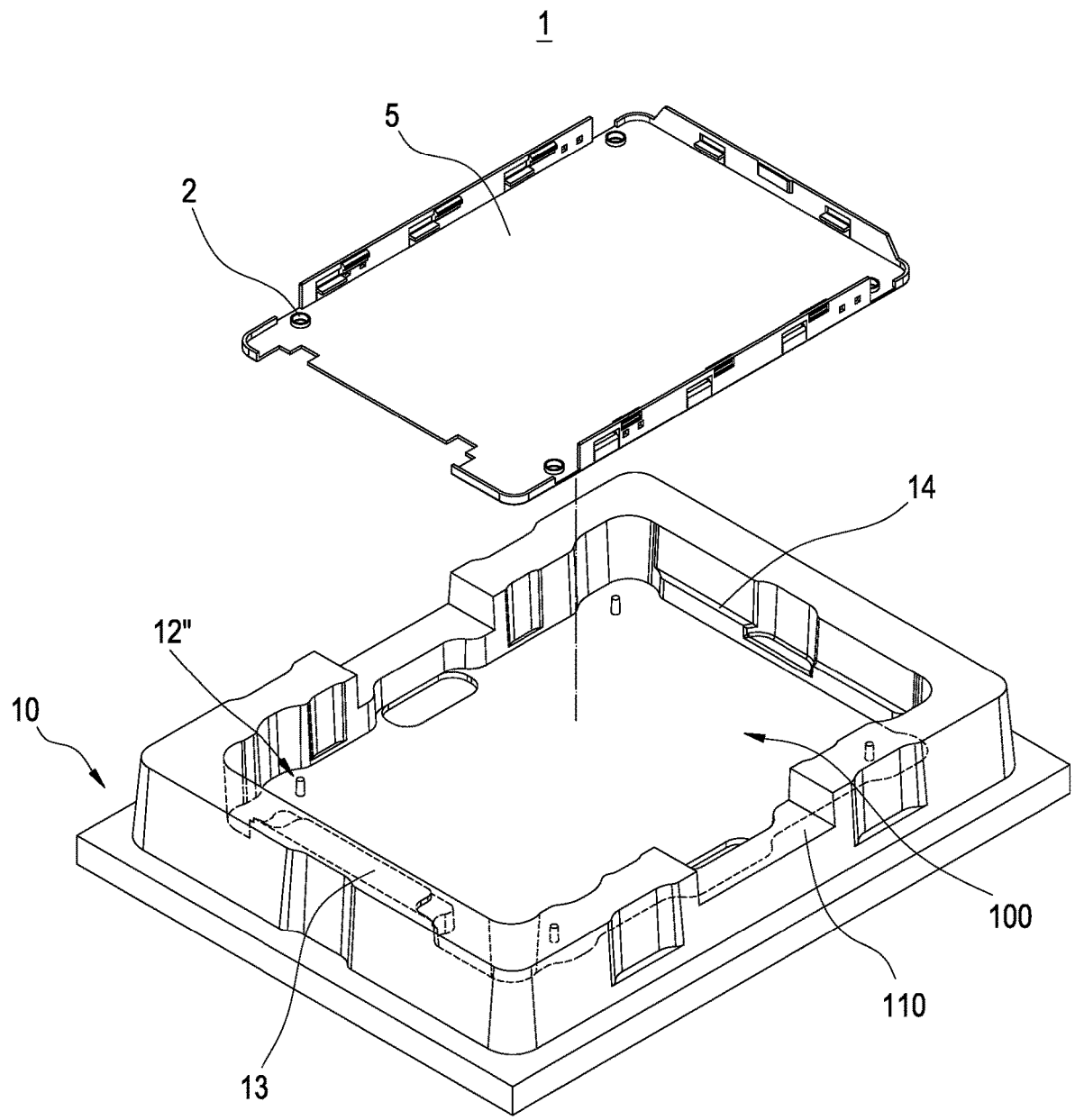
FIG. 4 is another combination schematic view of packaging tray and hard disk drive of the present invention.

Please further refer to FIG. 4, which depicts another combination schematic view of packaging tray combined a bottom cover of hard disk drive of the present invention. As shown in the figure, the packaging tray 1 of the present invention is provided for storing and positioning a bottom cover 5, and the bottom cover 5 has a plurality of positioning holes 2.

It should be noted that, the packaging tray 1 of the embodiment is substantially the same as the previous embodiment, and the difference is that the positioning post 12" of the packaging tray 1 is a tapered protrusion post without having a base.

Specifically, when the bottom cover 5 is placed on the packaging tray 1, the positioning post 12" of the packaging tray 1 is inserted in the positioning hole 2 of the bottom cover 5. Moreover, the bumps 115 of the packaging tray 1 abut against the left and right sides of the bottom cover 5 and restrict its movement.

Figure 5:
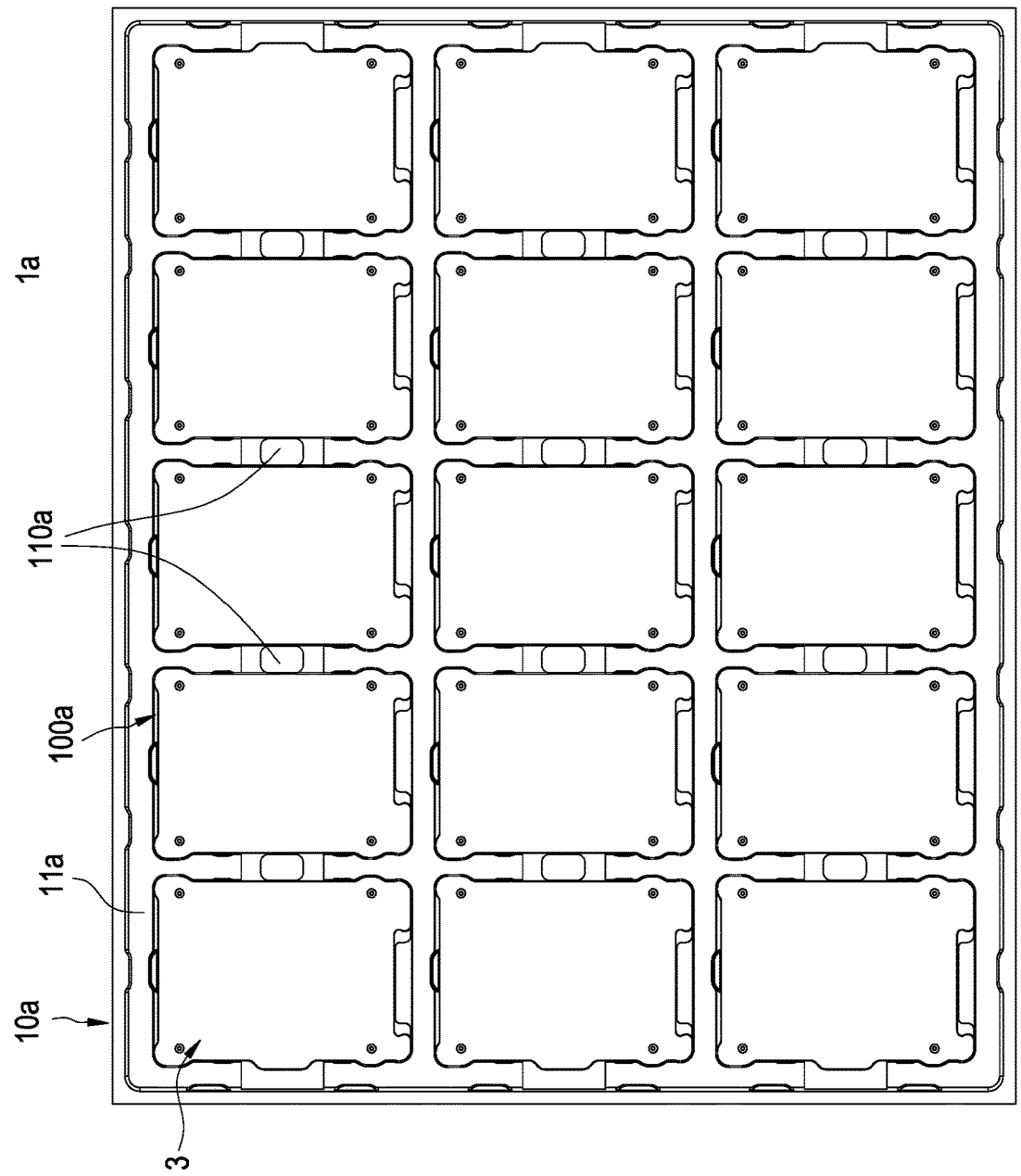
FIG. 5 is another embodiment of packaging tray for hard disk drive.

Please also refer to FIG. 5, which depicts another embodiment of packaging tray for a hard disk drive. In the present embodiment, the packaging tray 1*a* includes a box body 10*a*. The box body 10*a* has a plurality of frame walls 11*a* and a plurality of accommodating spaces 100*a* surrounded by the frame walls 11*a*, and the accommodating spaces 100*a* are disposed spaced apart and arranged in a matrix configuration.

Moreover, the box body 10*a* is formed with positioning structures such as the positioning posts, stages and bumps in each of the accommodating spaces 100*a* separately. The box body 10*a* has a notch 110*a* on the frame walls separately of adjacent accommodating spaces 110*a*. It is worth noting that, in the present embodiment, the notch 110*a* is provided on the left and right sides of the accommodating spaces 100*a*, so that a user can take out the hard disk drive 3 from the accommodation space 100*a*.

Although the present invention has been described with reference to the preferred embodiment thereof, it will be understood that the invention is not limited to the details thereof. Various substitutions and improvements have been suggested in the foregoing description, and others will occur to those of ordinary skill in the art. Therefore, all such substitutions and improvements are intended to be embraced within the scope of the invention as defined in the appended claims.

What is claimed is:

1. A packaging tray for storing and locating a hard disk drive having a plurality of positioning holes, the packaging tray including a box body, the box body having a plurality of frame walls and an accommodating space surrounded by the frame walls, the box body forming a plurality of positioning posts at a bottom of the accommodating space, and the positioning posts disposed corresponding to the positioning holes of the hard disk drive;

wherein the frame walls include a front frame wall, a rear frame wall, a left frame wall and a right frame wall; the front frame wall and the rear frame wall, the left frame wall and the right frame wall are disposed correspondingly; and wherein the hard disk drive includes an upper cover and a bottom cover; the box body has formed a front stage located on an inner side of the front frame wall in the accommodating space, and the front stage is disposed for positioning the upper cover.

2. The packaging tray according to claim 1, wherein the box body has a rectangular configuration, and each of the positioning posts is disposed at a corner of the accommodating space.

3. The packaging tray according to claim 1, wherein each of the positioning posts includes a base and a protrusion column disposed on the base.

4. The packaging tray according to claim 1, wherein the box body has formed at least one rear stage on an inner side of the rear frame wall in the accommodating space; the front stage and the rear stage are disposed for positioning a front side and a rear side of the upper cover respectively.

5. The packaging tray according to claim 1, wherein the left frame wall and the right frame wall are formed with a plurality of bumps on a side facing the accommodating space separately, and the bumps abut and restrict a left and a right sides of the hard disk drive.

6. The packaging tray according to claim 1, wherein the left frame wall and the right frame wall have a notch separately, and the notch is located in a middle of a side of the hard disk drive.

7. The packaging tray according to claim 1, wherein the frame walls are surrounded to form a plurality of accommodating spaces, and the accommodating spaces are disposed spaced apart and arranged in a matrix configuration.

8. The packaging tray according to claim 7, wherein the box body has a notch on the frame walls of adjacent accommodating spaces separately.

9. A packaging tray for storing and locating a hard disk drive having a plurality of positioning holes, the packaging tray including a box body, the box body having a plurality of frame walls and an accommodating space surrounded by the frame walls, the box body forming a plurality of positioning posts at a bottom of the accommodating space, and the positioning posts disposed corresponding to the positioning holes of the hard disk drive;

wherein the frame walls include a front frame wall, a rear frame wall, a left frame wall and a right frame wall; the front frame wall and the rear frame wall, the left frame wall and the right frame wall are disposed correspondingly; and wherein the left frame wall and the right frame wall are formed with a plurality of bumps on a side facing the accommodating space separately, and the bumps abut and restrict a left and a right sides of the hard disk drive.

10. The packaging tray according to claim 9, wherein the box body has a rectangular configuration, and each of the positioning posts is disposed at a corner of the accommodating space.

11. The packaging tray according to claim 9, wherein each of the positioning posts includes a base and a protrusion column disposed on the base.

12. The packaging tray according to claim 9, wherein the box body has formed at least one rear stage on an inner side of the rear frame wall in the accommodating space; the front stage and the rear stage are disposed for positioning a front side and a rear side of the upper cover respectively.

13. The packaging tray according to claim 9, wherein the left frame wall and the right frame wall have a notch separately, and the notch is located in a middle of a side of the hard disk drive.

14. The packaging tray according to claim 9, wherein the frame walls are surrounded to form a plurality of accommodating spaces, and the accommodating spaces are disposed spaced apart and arranged in a matrix configuration.

15. The packaging tray according to claim 14, wherein the box body has a notch on the frame walls of adjacent accommodating spaces separately.

16. A packaging tray for storing and locating a hard disk drive having a plurality of positioning holes, the packaging tray including a box body, the box body having a plurality of frame walls and an accommodating space surrounded by the frame walls, the box body forming a plurality of positioning posts at a bottom of the accommodating space, and the positioning posts disposed corresponding to the positioning holes of the hard disk drive;

wherein the frame walls are surrounded to form a plurality of accommodating spaces, and the accommodating spaces are disposed spaced apart and arranged in a matrix configuration.

17. The packaging tray according to claim 16, wherein the box body has a notch on the frame walls of adjacent accommodating spaces separately.

* * * * *